(12) United States Patent
Chu (10) Patent No.: US 12,444,179 B2
(45) Date of Patent: Oct. 14, 2025

(54) MODEL TRAINING METHOD AND MODEL TRAINING SYSTEM

(71) Applicant: PEGATRON CORPORATION, Taipei (TW)

(72) Inventor: Shih-Jen Chu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 328 days.

(21) Appl. No.: 18/313,303

(22) Filed: May 5, 2023

(65) Prior Publication Data

US 2024/0013523 A1 Jan. 11, 2024

(30) Foreign Application Priority Data

Jul. 8, 2022 (TW) .................. 111125804

(51) Int. Cl.
*G06V 10/776* (2022.01)
*G06V 10/764* (2022.01)
*G06V 10/774* (2022.01)

(52) U.S. Cl.
CPC .......... *G06V 10/776* (2022.01); *G06V 10/774* (2022.01)

(58) Field of Classification Search
USPC .................... 382/159, 155; 706/20
See application file for complete search history.

(56) References Cited

U.S. PATENT DOCUMENTS

| 12,260,616 | B1 * | 3/2025 | Rajan | G06V 10/82 |
| 2019/0042952 | A1 * | 2/2019 | Jia | G06N 3/045 |
| 2020/0057916 | A1 * | 2/2020 | Yamamoto | G06V 10/764 |
| 2021/0152439 | A1 | 5/2021 | Soulhi et al. | |
| 2021/0224647 | A1 * | 7/2021 | Wang | G06N 3/045 |
| 2021/0349897 | A1 | 11/2021 | Pierri et al. | |
| 2023/0047628 | A1 * | 2/2023 | Zhou | G06N 3/0464 |
| 2023/0206080 | A1 * | 6/2023 | Wang | G06N 3/048 706/15 |
| 2023/0410481 | A1 * | 12/2023 | Guo | G06N 3/09 |
| 2024/0127074 | A1 * | 4/2024 | Wang | G06N 3/045 |
| 2024/0303976 | A1 * | 9/2024 | Wang | G06V 10/764 |

FOREIGN PATENT DOCUMENTS

| CN | 109978037 | 7/2019 |
| CN | 112016633 | 12/2020 |
| TW | I760657 | 4/2022 |

* cited by examiner

*Primary Examiner* — Ishrat I Sherali
(74) *Attorney, Agent, or Firm* — J.C. PATENTS (57) ABSTRACT

A model training method and a model training system are disclosed. The method includes the following. In a first iteration training, first training data corresponding to a first sub-task and second training data corresponding to a second sub-task are input to a target model. A first and a second image identification rate of the target model with respect to the first and the second sub-task are evaluated respectively according to a first output corresponding to the first sub-task and a second output corresponding to the second sub-task from the target model. A first and a second sampling rate respectively corresponding to the first and the second training data in a second iteration training are adjusted according to the first and the second image identification rate. The first and the second sampling rate are respectively negatively correlated to the first and the second image identification rate.

14 Claims, 6 Drawing Sheets

MODEL TRAINING METHOD AND MODEL TRAINING SYSTEM

CROSS-REFERENCE TO RELATED APPLICATION

This application claims the priority benefit of Taiwan application serial no. 111125804, filed on Jul. 8, 2022. The entirety of the above-mentioned patent application is hereby incorporated by reference herein and made a part of this specification.

BACKGROUND

Technology Field

The disclosure relates to a model training method and a model training system.

Description of Related Art

The use of artificial intelligence technology for image identification has gradually become popular in people's daily life, such as abnormal detection, etc. Generally, an artificial intelligence model or a deep learning model is required to be trained before use, for example, by inputting a large number of training images to the artificial intelligence model or the deep learning model, so that the artificial intelligence model or the deep learning model may independently learn image features related to objects to be identified, so as to improve identification accuracy of different types of objects to be identified. However, in practice, it has been found that the artificial intelligence model or the deep learning model does not strengthen learning for training images with low identification accuracy, resulting in a low learning ability of the model for more difficult tasks.

SUMMARY

The disclosure provides a model training method and a model training system, which may improve the above issue.

An embodiment of the disclosure provides a model training method adapted to a task filter in a model training system. The model training method includes the following. In a first iteration training, first training data corresponding to a first sub-task and second training data corresponding to a second sub-task are input to a target model. A first image identification rate and a second image identification rate of the target model with respect to the first sub-task and the second sub-task are evaluated respectively according to a first output corresponding to the first sub-task and a second output corresponding to the second sub-task from the target model. A first sampling rate and a second sampling rate respectively corresponding to the first training data and the second training data in a second iteration training are adjusted according to the first image identification rate and the second image identification rate. The first sampling rate is negatively correlated to the first image identification rate, and the second sampling rate is negatively correlated to the second image identification rate.

An embodiment of the disclosure provides a model training system including a storage circuit and a processor. The storage circuit is configured to store a target model and a task filter. The processor is coupled to the storage circuit. The processor is configured to run the task filter to: in a first iteration training, input first training data corresponding to a first sub-task and second training data corresponding to a second sub-task to the target model; evaluate a first image identification rate and a second image identification rate of the target model with respect to the first sub-task and the second sub-task respectively according to a first output corresponding to the first sub-task and a second output corresponding to the second sub-task from the target model; and adjust a first sampling rate and a second sampling rate respectively corresponding to the first training data and the second training data in a second iteration training according to the first image identification rate and the second image identification rate. The first sampling rate is negatively correlated to the first image identification rate, and the second sampling rate is negatively correlated to the second image identification rate.

Based on the above, in the first iteration training, the training data corresponding to the first sub-task and the second sub-task may be respectively input into the target model. According to the first output and the second output of the target model, the respective image identification rates of the target model with respect to the two sub-tasks may be evaluated, and accordingly the sampling rates of the respective training data of the two sub-tasks in the next iteration training may be adjusted. In particular, since the sampling rate is negatively correlated with the image identification rate, the target model may be forced to perform repeated learning with respect to more difficult tasks, thereby effectively improving the training efficiency of the target model.

DESCRIPTION OF THE EMBODIMENTS

Figure 1:
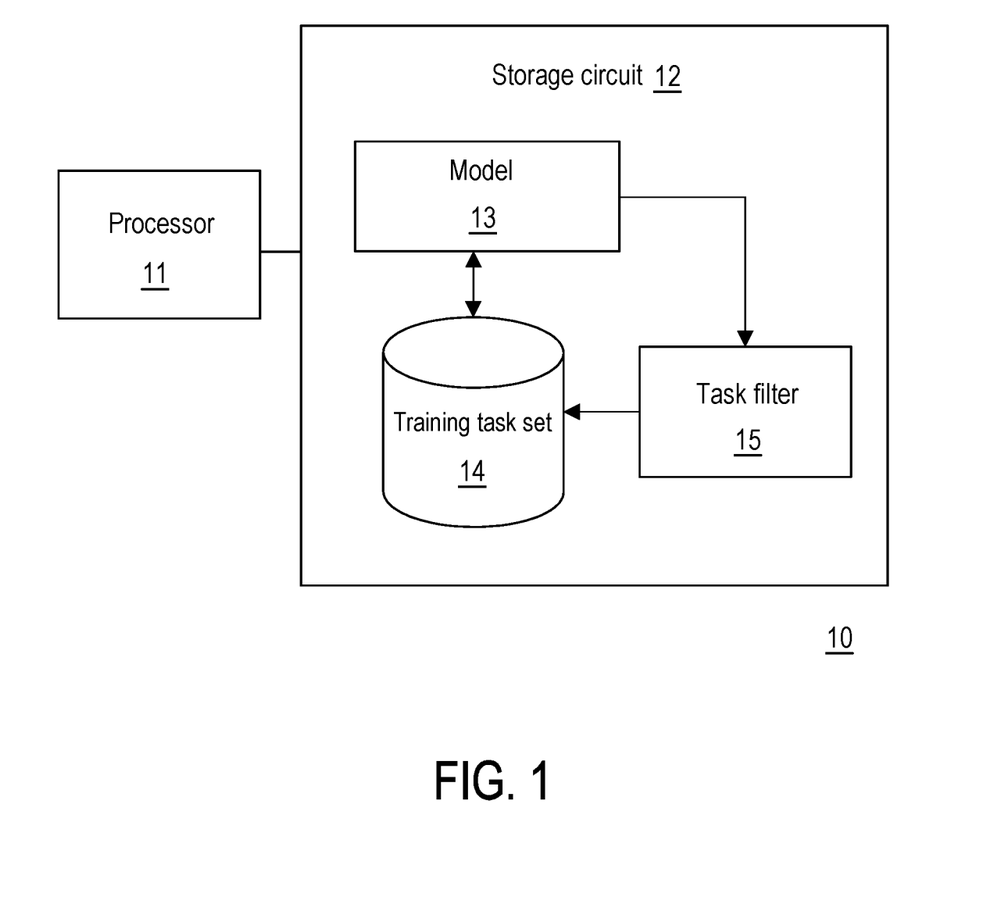
FIG. 1 is a schematic diagram of a model training system according to an embodiment of the disclosure.

FIG. 1 is a schematic diagram of a model training system according to an embodiment of the disclosure. Referring to FIG. 1, a model training system 10 may be installed or implemented in various computer systems such as smart phones, tablet computers, notebook computers, desktop computers or servers, etc., and the types of the computer systems are not limited thereto.

The model training system 10 includes a processor 11 and a storage circuit 12. The processor 11 is coupled to the storage circuit 12 and is responsible for the overall or partial operation of the model training system 10. For example, the processor 11 may include a central processing unit (CPU) or other programmable general-purpose or special-purpose microprocessors, digital signal processors (DSP), programmable controllers, application specific integrated circuits (ASIC), programmable logic devices (PLD) or other similar devices or a combination of these devices.

The storage circuit 12 is used for storing data. For example, the storage circuit 12 may include a volatile storage circuit and a non-volatile storage circuit. The volatile storage circuit is used for storing data in a volatile manner. For example, the volatile storage circuit may include a random access memory (RAM) or a similar volatile storage medium. The non-volatile storage circuit is used for storing data in a non-volatile manner. For example, the non-volatile storage circuit may include a read only memory (ROM), a solid state disk (SSD), a conventional hard disk drive (HDD) or a similar non-volatile storage medium.

The model training system 10 may further include an input/output interface for inputting or outputting signals. For example, the input/output interface may include various input/output devices such as a mouse, a keyboard, a screen, a network interface card, a speaker, or a microphone, and the type of the input/output interface is not limited thereto.

The storage circuit 12 may store a model (which also referred to as a target model) 13, a training task set 14 and a task filter 15. The model 13 may include a machine learning (ML) model or a deep learning (DL) model. The model 13 may be used to perform image identification. For example, the image identification may be used to identify (or detect) a specific object in an image. Alternatively, in an embodiment, the image identification may include image reconstruction. Related operation details of image reconstruction will be described in detail later.

The model 13 may have a neural network (NN) framework, which is also known as an artificial neural network or a neural network framework. For example, the model 13 may be implemented by using a convolutional neural network (CNN) or other types of neural network frameworks. It should be noted that how to design or implement an artificial intelligence model to perform image identification belongs to the prior art of the relevant technical field, so that details thereof will not be repeated here.

The model 13 may be trained to improve image identification accuracy (which is also referred to as an image identification rate). For example, during a training phase, training data may be used to train the model 13. For example, according to the training data, the model 13 may automatically learn and find important feature information in the training data. The model 13 may perform image identification on the training data according to the feature information. According to an image identification result of the model 13 on the training data, some system parameters or decision parameters used by an iterative unit inside the model 13 may be adjusted accordingly in order to try to improve the accuracy of the image identification performed by the model 13 (i.e., the image identification rate).

A plurality of sub-tasks may be stored in the training task set 14. Each sub-task may include multiple batches of training data. The training data is, for example, a plurality of images corresponding to the sub-task, which are also referred to as training images. The processor 11 may perform multiple iteration trainings on the model 13. In each iteration training, the processor 11 may run the task filter 15 to select at least a part of the sub-tasks from the training task set 14 to train the model 13. The task filter may be implemented through a program code or a firmware code. It should be noted that, in the following embodiments, the operations performed by the task filter 15 may be equivalent to those performed by the processor 11. In addition, the model training system 10 of FIG. 1 will be described below with reference of a flowchart of FIG. 2.

Figure 2:
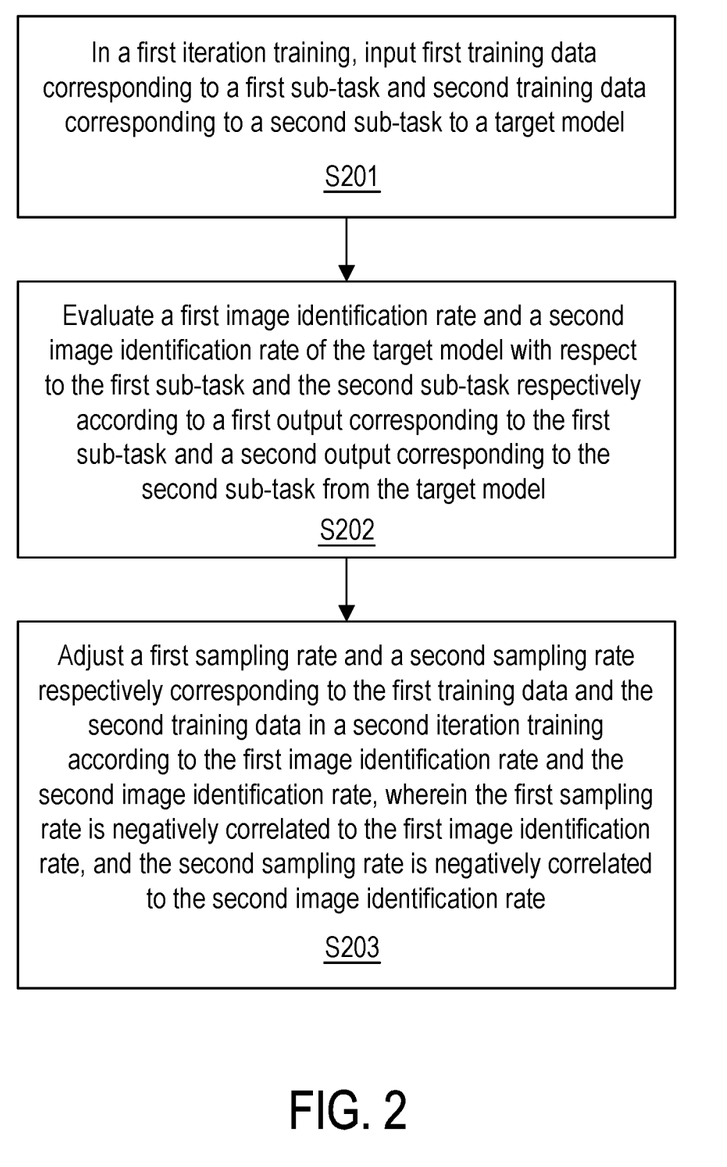
FIG. 2 is a flowchart of a model training method according to an embodiment of the disclosure.

FIG. 2 is a flowchart of a model training method according to an embodiment of the disclosure. Referring to FIG. 1 and FIG. 2, in step S201, in at least one iteration training (which is also referred to as a first iteration training), the task filter 15 may input training data corresponding to at least a part of the sub-tasks in the training task set 14 into the model 13 to train the model 13. For example, the at least a part of the sub-tasks may include a first sub-task and a second sub-task, and the training data corresponding to the at least a part of the sub-tasks may include training data (which is also referred to as first training data) corresponding to the first sub-task and training data (which is also referred to as second training data) corresponding to the second sub-task. The training image in the first training data is also referred to as a first training image. The training image in the second training data is also referred to as a second training image. Namely, in the first iteration training, the task filter 15 may train the model 13 according to at least the first training data and the second training data. For the convenience of description, the first sub-task and the second sub-task will be used as examples of sub-tasks for training the model 13. However, the disclosure does not limit a total number of the sub-tasks used to train the model 13 in the first iteration training.

In the first iteration training, the model 13 may analyze the first training data and the second training data and generate corresponding outputs. For example, the model 13 may analyze the first training image in the first training data and generate an output (which is also referred to as a first output) corresponding to the first sub-task according to an analysis result. The first output may reflect an image identification result of the model 13 on the first training image. In addition, the model 13 may analyze the second training image in the second training data and generate an output (which is also referred to as a second output) corresponding to the second sub-task according to an analysis result. The second output may reflect an image identification result of the model 13 on the second training image.

In an embodiment, the first training data may include the first training image and identification information corresponding to the first sub-task. For example, the first training data may be annotated as (x1, c1), where x1 corresponds to the first training image, and c1 is the identification information corresponding to the first sub-task. After the first training data is input into the model 13, the model 13 may perform image identification on the first training image and generate the first output according to an identification type of the first sub-task. Similarly, the second training data may include the second training image and identification information corresponding to the second sub-task. For example, the second training data may be annotated as (x2, c2), where x2 corresponds to the first training image, and c2 is the identification information corresponding to the second sub-task. After the second training data is input into the model 13, the model 13 may perform image identification on the second training image and generate the second output according to an identification type of the second sub-task. Deduced by analogy, $i^{th}$ training data corresponding to an $i^{th}$ sub-task may include an $i^{th}$ training image and identification information corresponding to the $i^{th}$ sub-task. For example, the $i^{th}$ training data may be annotated as (xi, ci). The $i^{th}$ sub-task includes the first sub-task and the second sub-task.

In step S202, the task filter 15 may respectively evaluate a first image identification rate and a second image identification rate of the target model with respect to the first sub-task and the second sub-task respectively according to the first output corresponding to the first sub-task and the second output corresponding to the second sub-task from the target model 13. For example, the first image identification rate may reflect an accuracy rate of the image identification performed by the model 13 with respect to the first sub-task, and the second image identification rate may reflect an accuracy rate of the image identification performed by the model 13 with respect to the second sub-task. By analogy, the task filter 15 may evaluate an image identification rate (which is also referred to as an $i^{th}$ image identification rate) of the model 13 with respect to the $i^{th}$ sub-task according to the output of the model 13 corresponding to the $i^{th}$ sub-task.

In an embodiment, the task filter 15 may compare the first output of the model 13 with verification data corresponding to the first sub-task, and obtain the first image identification rate according to the comparison result. For example, the task filter 15 may obtain the first image identification rate of the model 13 with respect to the first sub-task according to a difference between the first output and the verification data corresponding to the first sub-task (which is also referred to as a first error). The first image identification rate may be negatively correlated to the first error. Namely, the larger the first error is, the lower the first image identification rate is. Similarly, the task filter 15 may compare the second output of the model 13 with verification data corresponding to the second sub-task, and obtain the second image identification rate according to the comparison result (for example, a second error). By analogy, the task filter 15 may compare an $i^{th}$ output of the model 13 with verification data corresponding to the $i^{th}$ sub-task, and obtain an $i^{th}$ image identification rate of the model 13 with respect to the $i^{th}$ sub-task according to the comparison result.

In step S203, the task filter 15 may adjust sampling rates respectively corresponding to the first training data and the second training data in another iteration training (which is also referred to as a second iteration training) according to the first image identification rate and the second image identification rate. The corresponding sampling rate of the first training data in the second iteration training is also referred to as a first sampling rate, and the corresponding sampling rate of the second training data in the second iteration training is also referred to as a second sampling rate. Particularly, the first sampling rate may be negatively correlated to the first image identification rate, and the second sampling rate may be negatively correlated to the second image identification rate. By analogy, the task filter 15 may adjust a sampling rate (which is also referred to as an $i^{th}$ sampling rate) corresponding to the $i^{th}$ training data in the second iteration training according to the $i^{th}$ image identification rate.

To be specific, the first sampling rate may affect a probability of the first training data being input to the model 13 in the subsequent (such as a next) iteration training (such as the second iteration training), and the second sampling rate may affect a probability of the second training data being input to the model 13 in the subsequent iteration training. By analogy, the $i^{th}$ sampling rate may affect a probability of the $i^{th}$ training data being input into the model 13 in the subsequent iteration training. For example, the probability of the first training data being input to the model 13 may include the number of the first training images being input to the model 13.

In an embodiment, it is assumed that in the first iteration training of the model 13, the sampling rates of all sub-tasks in the training task set 14 are the same, for example, they are all a preset value "0.5" or other values. At this time, the task filter 15 may randomly select at least a part of the sub-tasks from these sub-tasks with the same sampling rate to train the model 13. For example, the task filter 15 may sequentially input the training data corresponding to the selected sub-tasks into the model 13 to train the model 13.

In an embodiment, it is assumed that at least a part of the sub-tasks selected by the task filter 15 for performing iteration training (i.e., the first iteration training) on the model 13 in the previous (or several previous) iteration include the $i^{th}$ sub-task in the training task set 14. According to the training result of the first iteration training, the task filter 15 may adjust the sampling rate of the $i^{th}$ sub-task. For example, if the image identification rate of the model 13 with respect to the $i^{th}$ sub-task is low in the first iteration training, the task filter 15 may increase the sampling rate corresponding to the $i^{th}$ sub-task. Alternatively, if the image identification rate of the model 13 with respect to the $i^{th}$ sub-task is relatively high in the first iteration training, the task filter 15 may reduce the sampling rate corresponding to the $i^{th}$ sub-task.

In an embodiment, by increasing the sampling rate of the sub-tasks with a lower image identification rate, the task filter 15 may improve the probability that the more difficult sub-tasks are selected to train the model 13 in the subsequent iteration training (i.e., the second iteration training), thus forcing the model 13 to repeatedly learn the image features of the training images corresponding to these difficult sub-tasks in the subsequent iteration training. On the other hand, by reducing the sampling rate of the sub-tasks with a higher image identification rate, the task filter 15 may reduce the probability that the easier-to-handle sub-tasks are selected to train the model 13 in the subsequent iteration training (i.e., the second iteration training), thus forcing the model 13 to skip the easier-to-handle sub-tasks in the subsequent iteration training. It should be noted that whether it is to force the model 13 to increase the probability of using more difficult sub-tasks for training and/or reduce the probability of using easier-to-handle sub-tasks for training in subsequent iteration training, it may effectively improve the training efficiency with respect to the model 13.

In an embodiment, the task filter 15 may determine whether the image identification rate of the model 13 with respect to the $i^{th}$ sub-task in the previous (or several previous) iteration training (i.e. the first iteration training) with respect to the model 13 is below a threshold value. For example, an image reconstruction rate of the $i^{th}$ sub-task may be represented by an evaluation value. The evaluation value may reflect the image identification rate of the model 13 with respect to the $i^{th}$ sub-task. For example, the evaluation value may be a value between 0-1. In an embodiment, the evaluation value may be positively correlated to the image identification rate of the model 13 with respect to the $i^{th}$ sub-task. Namely, the higher the image identification rate of the model 13 with respect to the $i^{th}$ sub-task is, the larger the evaluation value is. The task filter 15 may compare the evaluation value with the threshold value to evaluate whether the image identification rate of the model 13 with respect to the $i^{th}$ sub-task is lower than the threshold value.

In an embodiment, in response to the image identification rate of the model 13 with respect to the $i^{th}$ sub-task being lower than the threshold value, the task filter 15 may increase the sampling rate of the $i^{th}$ sub-task. In this way, the probability that the task filter 15 selects the $i^{th}$ sub-task to train the model 13 in the subsequent iteration training (i.e., the second iteration training) may be increased. On the other hand, in response to the image identification rate of the model 13 with respect to the $i^{th}$ sub-task not lower than the threshold value, the task filter 15 may maintain (i.e., does not change) or reduce the sampling rate of the $i^{th}$ sub task.

In an embodiment, the task filter 15 may determine whether the image identification rate of the model 13 with respect to the $i^{th}$ sub-task in the previous (or several previous) iteration training (i.e. the first iteration training) on the model 13 is relatively lower than the image identification rates of the model 13 with respect to the rest of the sub-tasks. In response to the image identification rate of the model 13 with respect to the $i^{th}$ sub-task being relatively lower than the image identification rates of the model 13 with respect to the rest of the sub-tasks, the task filter 15 may increase the sampling rate of the $i^{th}$ sub-task. On the other hand, in response to the image identification rate of the model 13 with respect to the $i^{th}$ sub-task being not relatively lower than the image identification rates of the model 13 with respect to the rest of the sub-tasks, the task filter 15 may maintain (i.e. does not change) or reduce the sampling rate of the $i^{th}$ sub-task.

Taking the first image identification rate and the second image identification rate as an example, in an embodiment, in response to the first image identification rate being smaller than the second image identification rate, the task filter 15 may increase the first sampling rate corresponding to the first sub-task. Alternatively, in another embodiment, in response to the first image identification rate being greater than the second image identification rate, the task filter 15 may increase the second sampling rate corresponding to the second sub-task.

In an embodiment, it is assumed that in the first iteration training, multiple sub-tasks are used to train the model 13. The task filter 15 may adjust the sampling rate of the $i^{th}$ sub-task according to a following equation (1.1):

$$PS(i) = \frac{(1 - P(i))}{\sum_{i=1}^{K}(1 - P(i))} \quad (1.1)$$

In the equation (1.1), PS (i) corresponds to the sampling rate of the $i^{th}$ sub-task, P (i) is the image identification rate of the model 13 with respect to the $i^{th}$ sub-task, and K is a total number of the multiple sub-tasks. For example, P(i) may be determined according to the evaluation value to reflect the image identification rate of the model 13 with respect to the $i^{th}$ sub-task. For example, P(i) may be the same or positively correlated with the evaluation value. By increasing the sampling rates of the sub-tasks with low image identification rate and/or reducing the sampling rates of the sub-tasks with high image identification rate, it is possible to force the model 13 to increase the probability of using more difficult sub-tasks for training and/or reduce the probability of using easier-to-handle sub-tasks for training in the subsequent iteration training, so as to effectively improve the training efficiency for the model 13.

In an embodiment, the image identification is used to detect a specific object in the training images, such as a human face, a cat or a dog, etc., presented in the training images. The image identification result of the model 13 with respect to the $i^{th}$ training image may reflect whether the model 13 successfully identifies the specific object presented in the $i^{th}$ training image, and/or the identification accuracy of the model 13 with respect to the specific object in the $i^{th}$ training image.

In an embodiment, the image identification further includes image reconstruction. In an embodiment, the image identification result of the model 13 with respect to the $i^{th}$ training image may include the image reconstruction result of the model 13 with respect to the $i^{th}$ training image, and/or an accuracy rate (which is also known as an image reconstruction rate) of the model 13 with respect to the specific object in the $i^{th}$ training image. In the following description, the model 13 using the image reconstruction technology is taken as an example for illustration, but in other embodiments, the model 13 may still use other types of image recognition technology, which is not limited in the disclosure.

Figure 3:
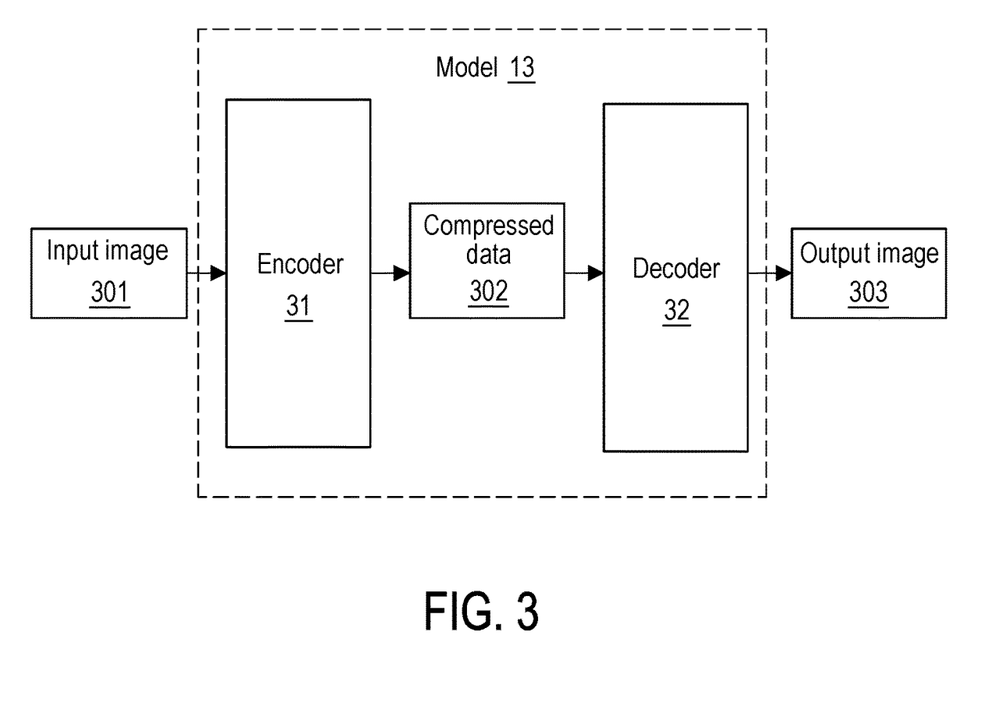
FIG. 3 is a schematic diagram of image reconstruction performed by a target model according to an embodiment of the disclosure.

FIG. 3 is a schematic diagram of image reconstruction performed by a target model according to an embodiment of the disclosure. Referring to FIG. 3, the model 13 may perform image reconstruction on an input image 301 and generate an output image 303. For example, the model 13 may include an autoencoder or a similar neural network framework that may be used to perform image analysis techniques such as image reconstruction.

The model 13 may include an encoder 31 and a decoder 32. The encoder 31 is coupled to an input terminal of the model 13 and is configured to receive the input image 301. The encoder 31 may encode or compress the input image 301 to generate compressed data 302. The compressed data 302 may carry feature information (such as feature vectors) related to the input image 301. The decoder 32 is coupled to an output terminal of the model 13. The decoder 32 is configured to receive the compressed data 302 and decode or decompress the compressed data 302 to generate the output image 303. Alternatively, from another point of view, the encoder 31 may be used to map each pixel in the input image 301 to a set of multiple feature vectors (or referred to as compressed representation), and the decoder 32 may be used to restore the set of these feature vectors back to the output image 303 including a plurality of pixels.

In an embodiment, both of the encoder 31 and the decoder 32 may be implemented by a convolutional neural network framework. However, in another exemplary embodiment, the encoder 31 and the decoder 32 may also be implemented by other types of network frameworks, which is not limited by the disclosure. It should be noted that the design and operation of the autoencoder are known in the art, so that details will not be repeated here.

In an embodiment, the task filter 15 may evaluate the image reconstruction rate of the model 13 with respect to the $i^{th}$ sub-task according to the output of the model 13. Taking FIG. 3 as an example, the task filter 15 may evaluate the image reconstruction rate of the model 13 with respect to the input image 301 according to the output image 303.

In an embodiment, the task filter 15 may obtain a reconstruction error of the model 13 with respect to the $i^{th}$ sub-task according to the output of the model 13. Then, the task filter 15 may determine an image reconstruction rate according to the reconstruction error. In particular, the image reconstruction rate may reflect the image identification rate of the model 13 with respect to the $i^{th}$ sub-task. For example, the image reconstruction rate may be positively correlated to the image identification rate of the model 13 with respect to the $i^{th}$ sub-task. Namely, the higher the image reconstruction rate is, the higher the image identification rate of the model 13 with respect to the $i^{th}$ sub-task is. In addition, the reconstruction error of the model 13 with respect to the $i^{th}$ sub-task may be negatively correlated with the image reconstruction rate. Namely, the larger the reconstruction error of the model 13 with respect to the $i^{th}$ sub-task is, the lower the image reconstruction rate of the model 13 with respect to the $i^{th}$ training image is.

In an embodiment, the task filter 15 may compare the output of the model 13 with the verification data corresponding to the $i^{th}$ sub-task. Then, the task filter 15 may obtain the reconstruction error of the model 13 with respect to the $i^{th}$ sub-task according to the comparison result. Then, the task filter 15 may determine the image reconstruction rate of the model 13 with respect to the $i^{th}$ sub-task according to the reconstruction error.

Figure 4:
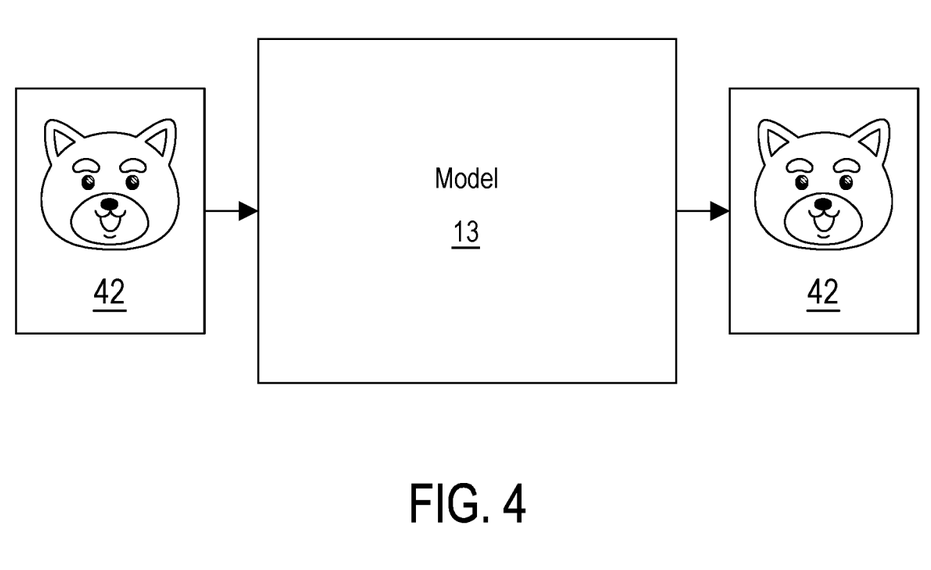
FIG. 4 and FIG. 5 are schematic diagrams of image reconstruction performed by a target model according to an embodiment of the disclosure.
Figure 5:
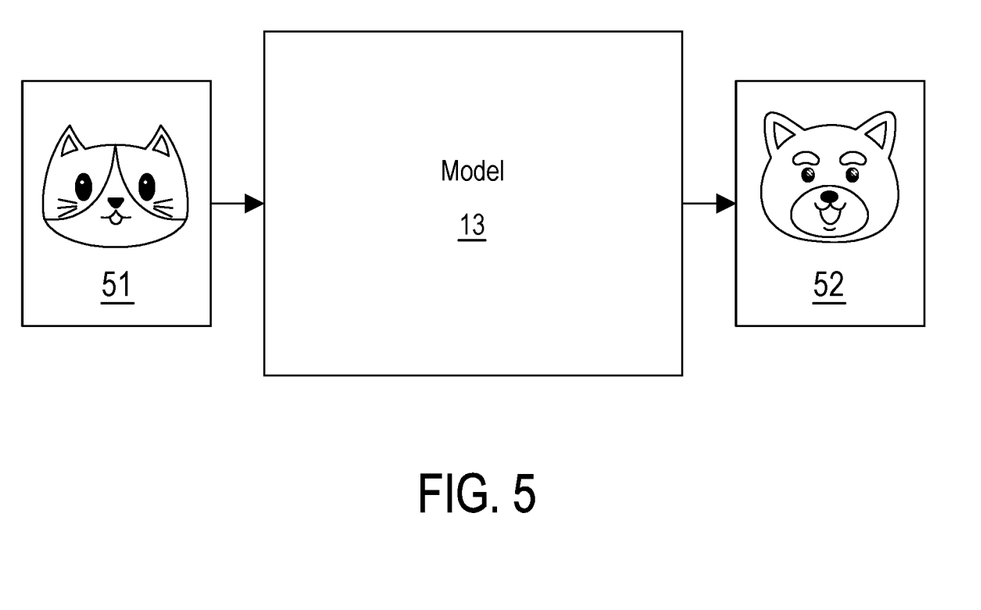

FIG. 4 and FIG. 5 are schematic diagrams of image reconstruction performed by a target model according to an embodiment of the disclosure. Referring to FIG. 4, in an embodiment, it is assumed that the $i^{th}$ sub-task (for example, one of the first sub-task or the second sub-task) includes a training image 41 (i.e., an input image), and a dog is presented in the training image 41. After the training image 41 is input to the model 13, the model 13 may generate an output image 42 according to the training image 41. It should be noted that in this example, a dog is also presented in the output image 42, which is almost identical to the dog in the training image 41. Therefore, according to the output of the model 13 (i.e., the output image 42), the task filter 15 may obtain an evaluation value. For example, this evaluation value may be 0.9 to reflect that the reconstruction error of the model 13 with respect to the $i^{th}$ sub-task is very low, the image reconstruction rate of the model 13 with respect to the $i^{th}$ sub-task is very high, and/or the image identification rate of the model 13 with respect to the $i^{th}$ sub-task is very high. Thereafter, the task filter 15 may properly reduce the sampling rate of the $i^{th}$ sub-task according to the image identification rate of the model 13 with respect to the $i^{th}$ sub-task, so as to try to reduce the probability that the $i^{th}$ sub-task is selected to train the model 13 in the subsequent training phase.

Referring to FIG. 5, in an embodiment, it is assumed that a $j^{th}$ sub-task (for example, one of the first sub-task or the second sub-task) includes a training image 51 (i.e., an input image), and a cat is presented in the training image 51. After the training image 51 is input to the model 13, the model 13 may generate an output image 52 according to the training image 51. It should be noted that in the example, a dog is presented in the output image 52 instead of the cat in the training image 51. Therefore, according to the output of the model 13 (i.e., the output image 52), the task filter 15 may obtain another evaluation value. For example, this evaluation value may be 0.1 to reflect that the reconstruction error of the model 13 with respect to the $j^{th}$ sub-task is very high, the image reconstruction rate of the model 13 with respect to the $j^{th}$ sub-task is very low, and/or the image identification rate of the model 13 with respect to the $j^{th}$ sub-task is very low. Thereafter, the task filter 15 may properly increase the sampling rate of the $j^{th}$ sub-task according to the image identification rate of the model 13 with respect to the $j^{th}$ sub-task, so as to try to increase the probability that the $j^{th}$ sub-task is selected to train the model 13 in the subsequent training phase.

It should be noted that in the embodiments shown in FIG. 4 and FIG. 5, by adjusting the sampling rate of the $i^{th}$ sub-task and the $j^{th}$ sub-task, the model 13 may be forced to repeatedly learn the more difficult sub-tasks and skip the easier sub-tasks in the subsequent iteration training. In this way, the training efficiency for the model 13 may be effectively improved.

Figure 6:
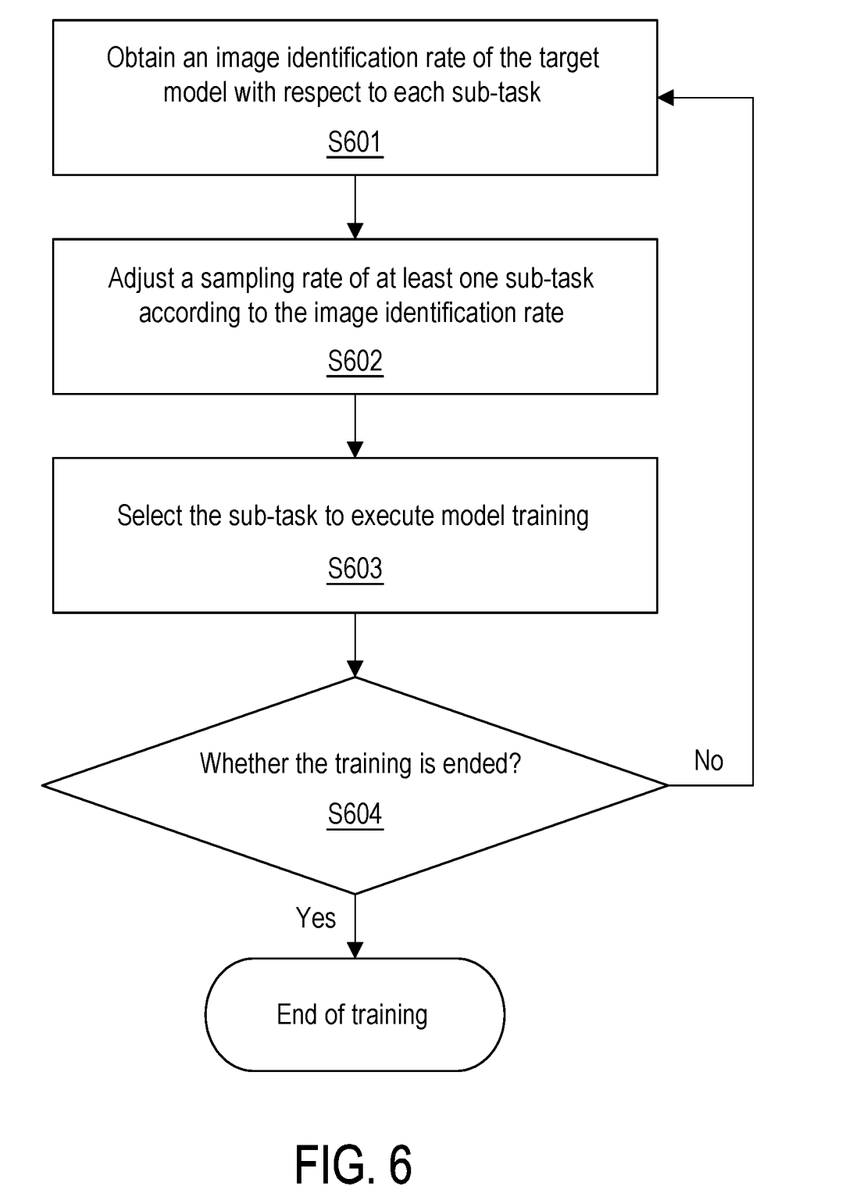
FIG. 6 is a flowchart of a model training method according to an embodiment of the disclosure.

FIG. 6 is a flowchart of a model training method according to an embodiment of the disclosure.

Referring to FIG. 6, in step S601, an image identification rate of the target model with respect to each sub-task is obtained. In step S602, a sampling rate of at least one sub-task is adjusted according to the image identification rate. In step S603, according to the sampling rate of each sub-task, at least a part of the sub-tasks is selected from a plurality of sub-tasks, and model training is performed based on the selected sub-tasks. In step S604, it determined whether the training is terminated (i.e., whether the iteration training of the target model is completed). For example, the task filter 15 may determine whether the image identification rates of the model 13 with respect to all sub-tasks are high enough, for example greater than 0.9. If yes, the model training method is ended. If not, the method flow returns to step S601 to obtain the image recognition rate of the target model with respect to each sub-task according to the training result of the previously performed iteration training. Then, steps S602 to S604 may be executed repeatedly.

It should be noted that in steps S602 and S603, the task filter 15 may not only adjust the probability of the corresponding training data being input to the model 13 for training in the next iteration training according to the image identification rate of each sub-task, but may also select whether to train the model 13 again with respect to a part of the sub-tasks in the next iteration training according to the image identification rate of each sub-task.

However, each step in FIG. 6 has been described in detail above, and will not be repeated here. It should be noted that each step in FIG. 6 may be implemented as a plurality of program codes or circuits, which is not limited by the disclosure. In addition, the method in FIG. 6 may be used in collaboration with the above exemplary embodiments, or may be used alone, which is not limited by the disclosure.

In summary, the model training method and model training system provided by the disclosed embodiments may adjust the sampling rate of each sub-task according to the reconstruction difficulty or identification difficulty of each sub-task with respect to the target model during the model training process. By adjusting the sampling rates of specific sub-tasks, the target model may be forced to repeatedly learn more difficult sub-tasks and skip easier sub-tasks in subsequent iteration training as much as possible. In this way, the training efficiency of the target model may be effectively improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A model training method, using a task filter in a model training system to improve training efficiency thereof, wherein the model training method comprises:
    in a first iteration training, inputting first training data corresponding to a first sub-task and second training data corresponding to a second sub-task to a target model comprising a neural network;
    evaluating and executing, by a processor using the task filter, a first image identification rate and a second image identification rate of the target model with respect to the first sub-task and the second sub-task respectively according to a first output corresponding to the first sub-task and a second output corresponding to the second sub-task from the target model; and
    adjusting and executing, by the processor using the task filter, a first sampling rate and a second sampling rate respectively corresponding to the first training data and the second training data in a second iteration training according to the first image identification rate and the second image identification rate, wherein the first sampling rate is negatively correlated to the first image identification rate, and the second sampling rate is negatively correlated to the second image identification rate, performing, by the target model, repeated learning with respect to one of the first sub-task and the second sub-task to reduce a reconstruction error of the target model, thus improving the training efficiency of the model training system.

2. The model training method according to claim 1, wherein the first training data comprises a training image corresponding to the first sub-task and identification information corresponding to the first sub-task, and the second training data comprises a training image corresponding to the second sub-task and identification information corresponding to the second sub-task.

3. The model training method according to claim 1, wherein the step of evaluating the first image identification rate of the target model with respect to the first sub-task according to the first output of the target model comprises:
calculating the reconstruction error of the target model with respect to the first sub-task according to the first output of the target model; and
determining an image reconstruction rate according to the reconstruction error, wherein the image reconstruction rate reflects the first image identification rate of the target model with respect to the first sub-task.

4. The model training method according to claim 3, wherein the step of calculating the reconstruction error of the target model with respect to the first sub-task according to the first output of the target model comprises:
comparing the first output of the target model with verification data corresponding to the first sub-task; and
obtaining the reconstruction error of the target model with respect to the first sub-task according to a comparison result.

5. The model training method according to claim 1, wherein the step of adjusting the first sampling rate corresponding to the first training data in the second iteration training according to the first image identification rate comprises:
increasing the first sampling rate in response to the first image identification rate being lower than a threshold.

6. The model training method according to claim 1, wherein the step of adjusting the first sampling rate and the second sampling rate respectively corresponding to the first training data and the second training data in the second iteration training according to the first image identification rate and the second image identification rate comprises:
increasing the first sampling rate in response to the first image identification rate being less than the second image identification rate; and
increasing the second sampling rate in response to the first image identification rate being greater than the second image identification rate.

7. The model training method according to claim 1, wherein the step of adjusting the first sampling rate and the second sampling rate comprises:
adjusting a sampling rate of an $i^{th}$ sub-task according to a following equation, wherein the $i^{th}$ sub-task is one of the first sub-task and the second sub-task:

$$PS(i) = \frac{(1 - P(i))}{\sum_{k=1}^{K}(1 - P(i))}$$

wherein PS (i) corresponds to the sampling rate of the $i^{th}$ sub-task, P (i) is an image identification rate corresponding to the $i^{th}$ sub-task, and K is a total number of the sub-tasks.

8. A model training system for improving training efficiency thereof, comprising:

a storage circuit configured to store a target model comprising a neural network and a task filter; and
a processor coupled to the storage circuit and configured to run the task filter to:
in a first iteration training, input first training data corresponding to a first sub-task and second training data corresponding to a second sub-task to the target model;
evaluate and executing, by a processor using the task filter, a first image identification rate and a second image identification rate of the target model with respect to the first sub-task and the second sub-task respectively according to a first output corresponding to the first sub-task and a second output corresponding to the second sub-task from the target model; and
adjust and executing, by the processor using the task filter, a first sampling rate and a second sampling rate respectively corresponding to the first training data and the second training data in a second iteration training according to the first image identification rate and the second image identification rate, wherein the first sampling rate is negatively correlated to the first image identification rate, and the second sampling rate is negatively correlated to the second image identification rate, performing, by the target model, repeated learning with respect to one of the first sub-task and the second sub-task to reduce a reconstruction error of the target model, thus improving the training efficiency of the model training system.

9. The model training system according to claim 8, wherein the first training data comprises a training image corresponding to the first sub-task and identification information corresponding to the first sub-task, and the second training data comprises a training image corresponding to the second sub-task and identification information corresponding to the second sub-task.

10. The model training system according to claim 8, wherein an operation of evaluating the first image identification rate of the target model with respect to the first sub-task according to the first output of the target model comprises:
calculating the reconstruction error of the target model with respect to the first sub-task according to the first output of the target model; and
determining an image reconstruction rate according to the reconstruction error, wherein the image reconstruction rate reflects the first image identification rate of the target model with respect to the first sub-task.

11. The model training system according to claim 10, wherein an operation of calculating the reconstruction error of the target model with respect to the first sub-task according to the first output of the target model comprises:
comparing the first output of the target model with verification data corresponding to the first sub-task; and
obtaining the reconstruction error of the target model with respect to the first sub-task according to a comparison result.

12. The model training system according to claim 8, wherein an operation of adjusting the first sampling rate corresponding to the first training data in the second iteration training according to the first image identification rate comprises:
increasing the first sampling rate in response to the first image identification rate being lower than a threshold.

13. The model training system according to claim 8, wherein an operation of adjusting the first sampling rate and the second sampling rate respectively corresponding to the first training data and the second training data in the second iteration training according to the first image identification rate and the second image identification rate comprises:
   increasing the first sampling rate in response to the first image identification rate being less than the second image identification rate; and
   increasing the second sampling rate in response to the first image identification rate being greater than the second image identification rate.

14. The model training system according to claim 8, wherein an operation of adjusting the first sampling rate and the second sampling rate comprises:
   adjusting a sampling rate of an $i^{th}$ sub-task according to a following equation, wherein the $i^{th}$ sub-task is one of the first sub-task and the second sub-task:

$$PS(i) = \frac{(1 - P(i))}{\sum_{k=1}^{K}(1 - P(i))}$$

wherein PS (i) corresponds to the sampling rate of the $i^{th}$ sub-task, P (i) is an image identification rate corresponding to the $i^{th}$ sub-task, and K is a total number of the sub-tasks.

* * * * *